J. H. PRICE.
AIR CYCLE.
APPLICATION FILED APR. 3, 1911.
1,013,952. Patented Jan. 9, 1912.
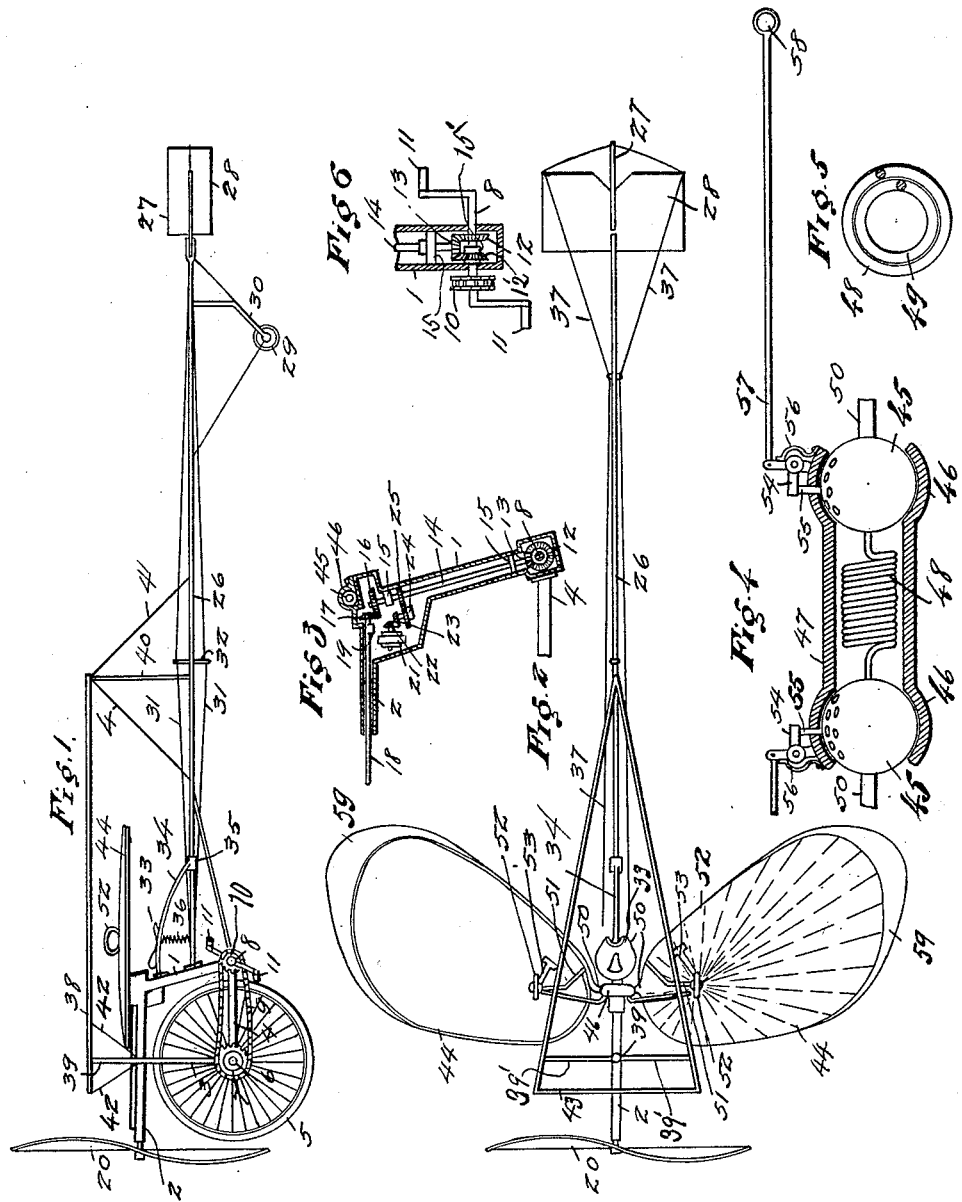
Witnesses
Inventor,
J. H. Price,
By A. L. Jackson.
Attorney

UNITED STATES PATENT OFFICE.

JOSEPH H. PRICE, OF FORT WORTH, TEXAS.

AIR-CYCLE.

1,013,952. Specification of Letters Patent. Patented Jan. 9, 1912.

Application filed April 3, 1911. Serial No. 618,605.

*To all whom it may concern:*

Be it known that I, JOSEPH H. PRICE, a citizen of the United States, residing at Fort Worth, in the county of Tarrant and State of Texas, have invented certain new and useful Improvements in Air-Cycles, of which the following is a specification.

My invention relates to air-cycles or flying machines and more particularly to a machine which may be operated either by pedals actuated by the feet or by a motor; and the object is to provide a simple device or machine with which a person can fly through the air at low or high elevations at will and without so much weight as is required in machines which must be driven by powerful motors.

The principal object is to dispense with heavy engines which are generally used for driving flying machines and to provide a machine by which a person can sail or glide at will with power which he can produce with his feet.

Another object is to provide the machine with wings which are connected to the machine by ball and socket joint by which a person can guide the machine with greater precision in making ascents or descents and other movements, and to provide a rudder which is connected to a plane for coöperating with the wings.

Other objects and advantages will be fully explained in the following description and the invention will be more particularly pointed out in the claims.

Reference is had to the accompanying drawings which form a part of this application.

Figure 1 is a side elevation of the machine. Fig. 2 is a plan view, Fig. 3 is a vertical section of the casing which incloses the driving gear, showing the arrangement of the driving gear. Fig. 4 is a horizontal section of the casing which incloses the ball bearing connections for the wings. Fig. 5 is an end view of the coil springs which hold the ball bearings in place. Fig. 6 is a detail view of the gearing which is mounted in the lower part of the gear casing.

Similar characters of reference are used to indicate the same parts throughout the several views.

The improved machine is provided with a frame having an inclined portion 1 and a horizontal portion 2 and a fork 3 connected to the horizontal portion 2. A fork 4 is connected with the lower end of the fork 3 and attached to the lower end of the casing 1. A wheel 5 is provided with a shaft 6 which is journaled in the fork 3 and a sprocket wheel 7 is mounted on the shaft 6 for driving the wheel 5. A shaft 8 is journaled in the lower part of the casing 1 and a sprocket chain 9 transmits the power from the sprocket wheel 10 to the sprocket wheel 7. The shaft 8 is driven by the pedals 11. A bevel gear wheel 12 is mounted on shaft 8 to drive a bevel pinion 13 which is mounted on a shaft 14. The shaft 14 is journaled in bearings 15 in the casing 1. A bevel gear 16 is mounted on the upper end of the shaft 14 to drive a bevel pinion 17 which is mounted on shaft 18. The shaft 18 is mounted in the casing 2 and provided with a bearing 19 and drives the propeller 20. This completes a description of one way of driving the machine. The machine can also be driven by a motor 21 which is mounted in the casing 1. This motor is provided with bevel gear wheels 22 and 23 and gear wheels 24 and 25 for driving the shaft 14. The machine can be driven by foot power on the pedals or driven by the motor or driven by both foot power and the motor. The wheels 12 and 13 and 16 and 17 can be of suitable sizes to multiply the speed of the shaft 18.

A supporting rod 26 is attached to the casing 1 and extends horizontally backward to support the rudder 27 and the plane 28. This rod carries a rear wheel 29 which is an idle wheel and connected to the rod 26 by a hanger 30. The rod 26 is braced by wires 31 and bar 32. A seat 33 is mounted on a spring bar 34 which is connected at one end to the casing 1 and which is provided with a cuff 35 which is slidable on the rod 26. The seat 33 is further provided with a coil spring 36 for making the seat resilient or to form a cushion for the seat. The rudder can be controlled by wires 37 which extend near the seat 33, where they can be manually operated. A plane 38 is mounted above the seat and other parts of the machine. The plane 38 is supported from the casing 2 by an upright post 39 with arms 39′ and a post 40 and is provided with suitable brace wires 41. The post 40 and the wires 41 are attached to the rod 26. At the front end the plane is braced by wires 42 and arms 39′. Only a skeleton plane is shown in Fig. 2 so that the wing connection may be indicated.

43 indicates the frame of the plane.

Two wings 44 are provided for sailing purposes. The wings 44 are connected to the machine by ball and socket joints. The balls 45 are mounted in sockets 46 which are mounted on the casing 1. The sockets 46 are connected with each other by a tubular body 47 which may be securely bolted to the top of the casing 1. The balls are held in place by double tension springs 48 and 49. The wings 44 are connected to the balls 45 by shanks 50 which may be parts of the frames of the wings. The wings are movable manually by handles 51 which are provided with loops 52 for grasping with the hand and also provided with rests 53 on which the forearms are braced in operating the wings. By means of these handles the wings can be manipulated by the hands. Means are provided for locking the wings in stationary positions. A bell-crank lever 54 is pivotally connected with each socket and carries a pin 55 which bears against the surface of the ball 45 which is pitted to receive the pin. A spring 56 bears against the lever 54 and causes the lever to hold the pin 55 in engagement with the ball 45. A flexible cord or piece of leather 57 is attached to the lever 54 and extends to a position suitable for grasping with the hand. The loop 58 should be near the loop 52. A pull on the thong or handle 57 will release the ball so that it can be moved.

A portion 59 of each wing about the edges of the wing may be made flexible to allow some elasticity in making sudden changes. The flexibility of the edges will yield to some extent when making sudden changes and yet for ordinary sailing purposes the flexible portions will perform the same functions as the rigid portions of the wings. The machine is provided with wheels 5 and 29 for running on the ground. The wheel 5 is also a driven wheel which will aid in propelling the machine.

In addition to the bearing 15, a bevel cog wheel 12' may be provided to prevent too much strain on the wheels 12 and 13. The wheel 12' is loosely mounted on a bearing 15' which is attached to the interior of the casing 1. This wheel 15' will tend to balance the pressure of the wheel 12, and thus prevent straining said wheel to one side of the casing 1.

Having fully described my invention, what I claim as new and desire to secure by Letters Patent, is,—

1. A flying machine having a frame including a tubular casing, a propeller, gearing including shafts journaled within said casing for driving said propeller, a plane mounted on said frame, movable wings below said plane, ball and socket joints mounted on said casing for connecting said wings to the casing, and a yielding member connected to the balls of said wings and tending to hold said wings in their normal positions.

2. A flying machine having a frame including a tubular casing, a propeller, gearing including shafts journaled within said casing for driving said propeller, a plane mounted on said frame above said casing, wings below said plane pivotally connected to said casing, handles for operating said wings, a rudder and a horizontally disposed rod connecting said rudder to said tubular casing.

3. A flying machine having a frame including a tubular casing and a vertically disposed fork connected to the upper part of said casing and a horizontally disposed fork connected to the lower part of said casing, a shaft journaled in both forks, a balance wheel mounted on said shaft, a propeller, gearing including shafts journaled within said casing, pedals for actuating said gearing, a plane above said frame attached thereto, wings below said plane pivotally connected to said casing, and arm rests and handles rigid with said wings for operating said wings.

4. A flying machine having a tubular casing, a frame connected with said casing, a propeller, gearing including shafts journaled within said casing for driving said propeller, a rudder connected to said casing, a plane above said frame attached thereto, wings below said plane, and means for pivotally connecting said wings to said machine consisting of balls and shanks attaching the wings to the balls, sockets for said balls and a tubular casing connecting said sockets, and coil springs connected to said balls, and handles for operating said wings.

5. A flying machine having a tubular casing, a frame connected with said casing, a propeller, gearing including shafts journaled within said casing for driving said propeller, a rudder connected with said casing, a plane above said frame attached thereto, wings below said plane, balls and shanks attaching said wings to said balls, a tubular casing having sockets therein for said balls attached to said first named casing, coil springs within said last named casing attached to said balls for holding the same in operative relation, handles for operating said wings, and means for locking said wings in different operative positions.

In testimony whereof I set my hand in the presence of two witnesses, this 20th day of February, 1911.

JOSEPH H. PRICE.

Witnesses:
A. L. JACKSON,
J. K. McCARTY.

Copies of this patent may be obtained for five cents each, by addressing the "Commissioner of Patents, Washington, D. C."